(12) United States Patent
Blewett et al.

(10) Patent No.: US 9,225,220 B2
(45) Date of Patent: Dec. 29, 2015

(54) INTEGRATED GAS TURBINE ENGINE ACCESSORIES

(71) Applicant: Hamilton Sundstrand Corporation, Charlotte, NC (US)

(72) Inventors: Michael R. Blewett, Stillman Valley, IL (US); Jeff A. Brown, Cherry Valley, IL (US); Jeffrey A. Stadler, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 442 days.

(21) Appl. No.: 13/933,742

(22) Filed: Jul. 2, 2013

(65) Prior Publication Data

US 2015/0008772 A1 Jan. 8, 2015

(51) Int. Cl.
*H02K 5/00* (2006.01)
*H02K 5/22* (2006.01)

(52) U.S. Cl.
CPC . *H02K 5/00* (2013.01); *H02K 5/225* (2013.01)

(58) Field of Classification Search
None
See application file for complete search history.

(56) References Cited

U.S. PATENT DOCUMENTS

| | | | | |
|---|---|---|---|---|
| 4,114,061 A * | 9/1978 | Hayes | ................. | H02K 5/148 310/241 |
| 6,919,661 B2 * | 7/2005 | Dubus | ................. | H02M 7/60 290/36 R |
| 2003/0109149 A1 * | 6/2003 | Abadia | ................. | H01R 13/506 439/13 |
| 2006/0186747 A1 * | 8/2006 | Regnard | ................. | H02K 5/225 310/71 |

* cited by examiner

*Primary Examiner* — Tran Nguyen
(74) *Attorney, Agent, or Firm* — Locke Lord LLP; Scott D. Wofsy; Joshua L. Jones

(57) ABSTRACT

An permanent magnet alternator stator assembly for an integrated air turbine starter and permanent magnet alternator assembly has a permanent magnet alternator stator winding assembly attached to a mounting structure. A quick electrical connector electrically connects to the stator winding assembly and is attached to the mounting structure. The mounting structure includes an alignment aperture for removably attaching the permanent magnet alternator winding assembly to an air turbine starter. An integrated air turbine starter and permanent magnet alternator assembly and accessory gearbox assembly are also described.

17 Claims, 3 Drawing Sheets

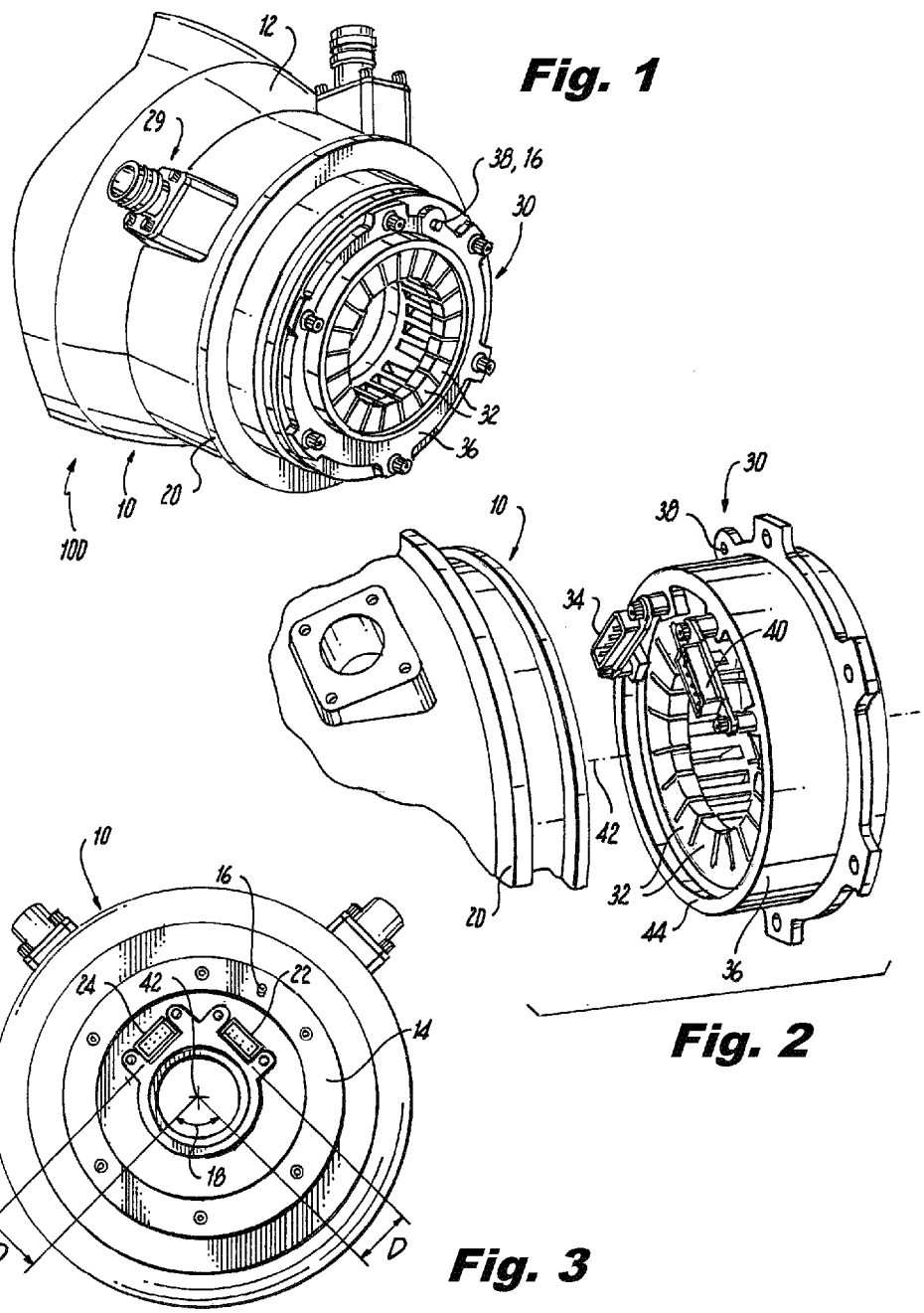

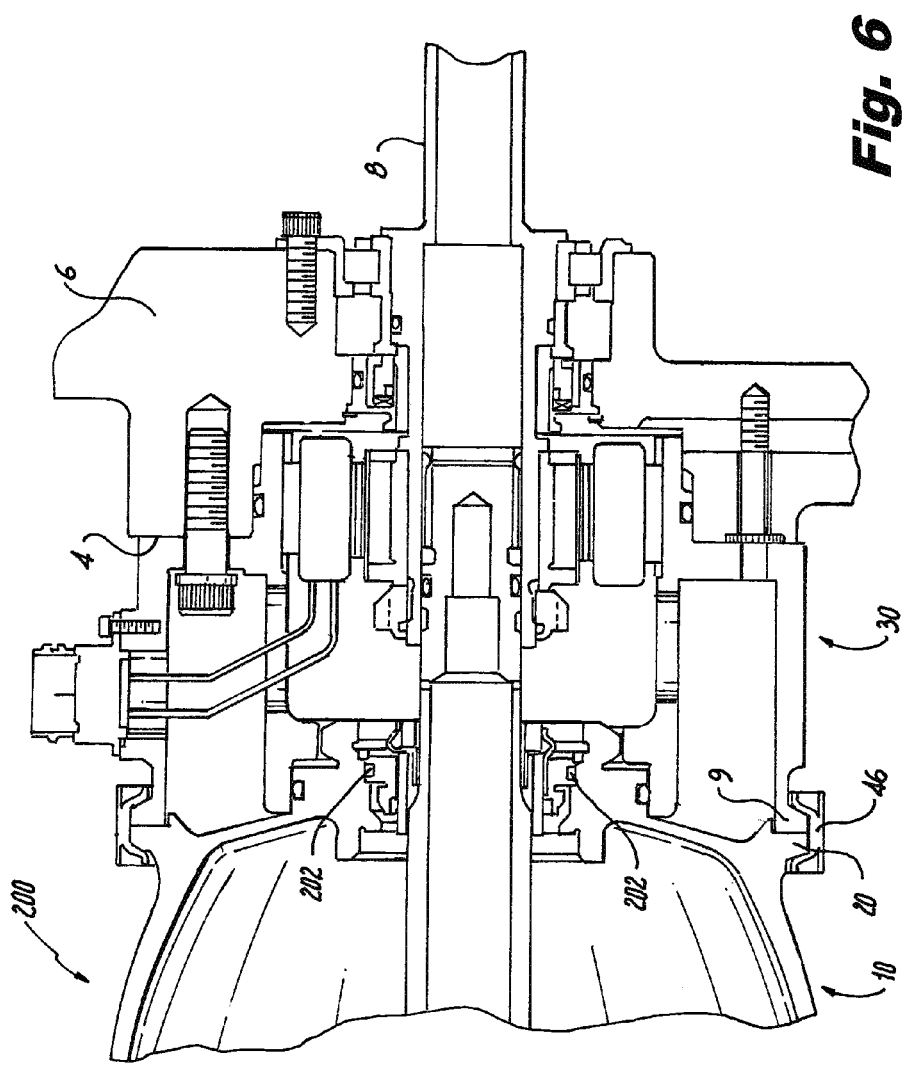

INTEGRATED GAS TURBINE ENGINE ACCESSORIES

BACKGROUND OF THE INVENTION

1. Field of the Invention

The present disclosure relates to integrated gas turbine engine accessories, and more particularly to integrated permanent magnet alternator stator and air turbine starter assemblies coupled to accessory gearboxes at a shared mounting pad.

2. Description of Related Art

Aircraft engines include accessories such as permanent magnet alternators and air turbine starters which attach to the engine through an accessory gearbox (AGB). Permanent magnet alternators (PMAs) commonly provide electrical power for devices like engine controllers and are powered by an AGB shaft that includes the PMA rotor. Air turbine starters (ATSs) provide power for engine starting and typically interface with the engine through an AGB shaft.

In conventional engine arrangements, the ATS and PMA attach to the AGB at separate AGB mounting pads with separate AGB shafts. PMAs are considered line replaceable units (LRUs) that require removal and reattachment for purposes of inspection, repair or replacement in accordance with a maintenance schedule. As LRUs, removal and replacement times are important consideration due to operation needs. LRU replacement times adversely impact aircraft dispatch requirements and are generally dictated by customer specifications.

Conventional PMA and ATS accessories have generally been considered satisfactory for their intended purpose. However, there remains an ongoing need to reduce the size and weight of such accessories. There also remains a need for accessories that are easy to make and use and that are readily detached and re-attached for servicing. The present disclosure provides a solution for these problems.

SUMMARY OF THE INVENTION

A PMA stator assembly for an integrated PMA and ATS assembly is provided. The PMA stator assembly includes a PMA stator winding assembly, a first PMA quick connector, and a PMA mounting structure. The PMA stator assembly and PMA quick connector mechanically couple to the PMA mounting structure. The PMA quick connector electrically connects to the PMA stator winding assembly. An alignment aperture defined in a face of the PMA mounting structure fixes the assembly rotationally with respect to an ATS housing.

In embodiments, the first PMA quick connector is radially offset from an axis of the PMA stator winding assembly. The PMA stator assembly can also include a second PMA quick connector electrically connected to the PMA stator winding assembly and radially offset from the axis of the PMA stator winding assembly. It is contemplated that the first and second PMA quick connectors are disposed on a common face of the PMA stator assembly.

An integrated PMA and ATS assembly is also provided. The PMA and ATS assembly includes a PMA stator assembly as describe above, an ATS with an ATS housing, and an alignment member. The ATS housing defines a PMA mounting face and includes an alignment member. The alignment member is axially received in the alignment aperture of the PMA mounting structure and radially fixes the PMA stator assembly with respect to the axis of the ATS housing.

In embodiments, the ATS housing defines a radial flange for removably attaching the PMA stator and ATS to an AGB mounting pad. The integrated assembly can include a first ATS quick connector disposed on the PMA housing mounting face. It is contemplated that the first and second ATS quick connectors electrically connect to the first and second PMA quick connectors, and are each radially offset by a common distance from an axis of the integrated assembly.

In certain embodiments, the integrated assembly includes an external PMA electrical connector for electrically connecting the PMA stator winding assembly to an engine harness assembly. It is contemplated that the integrated assembly further include an electrical lead disposed within the ATS housing electrically connecting the external PMA electrical connector to the PMA stator winding assembly. In embodiments, the electrical lead connects the external PMA connector to the first ATS quick connector.

An AGB assembly is further provided. The AGB assembly includes the above described PMA and ATS assembly, an AGB housing, and an AGB shaft. The AGB housing defines an AGB accessory mounting pad and the AGB shaft extends from the AGB into the ATS housing and includes a PMA rotor disposed on the shaft so as to be circumferentially surrounded by the PMA stator winding assembly.

In embodiments, the AGB accessory mounting pad defines an AGB radial flange opposing the ATS housing radial flange. A clamp can fix the integrated assembly to the AGB housing by surrounding and axially forcing together the AGB and ATS radial flanges. It is contemplated that the PMA stator assembly can axially stacked between the ATS housing and the AGB accessory mounting pad. It is also contemplated that the PMA stator assembly can be circumferentially enveloped by the ATS housing. In certain embodiments the PMA stator is radially enveloped by the ATS housing and AGB housing.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a perspective view of an integrated PMA and ATS assembly;

FIG. 2 is an exploded perspective view of the assembly of FIG. 1, showing mechanical and electrical connectors of the PMA assembly;

FIG. 3 is an axial view of the air turbine starter housing of FIG. 1, showing the mechanical and electrical connectors of the ATS housing;

FIG. 6 is a cross-sectional side elevation of an embodiment of an integrated PMA and ATS assembly, showing a PMA assembly in a stacked configuration between an ATS housing and an AGB mounting pad.

DETAILED DESCRIPTION OF THE PREFERRED EMBODIMENTS

Figure 4:
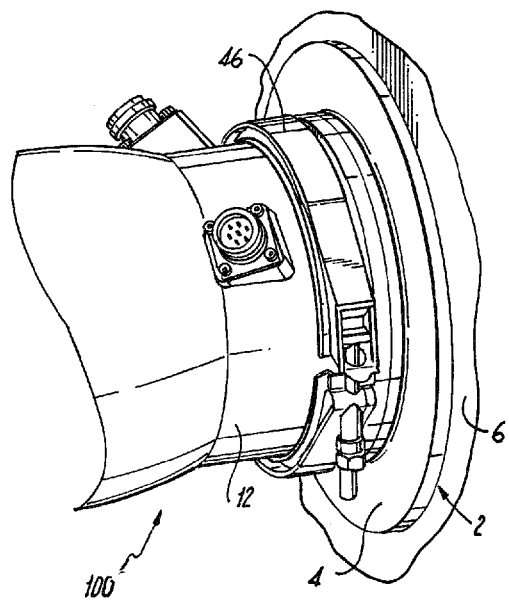
FIG. 4 is a side view of the integrated PMA and ATS assembly of FIG. 1, showing the assembly attached to a mounting pad of an AGB.

Reference will now be made to the drawings wherein like reference numerals identify similar structural features or aspects of the subject disclosure. For purposes of explanation and illustration, and not limitation, a partial view of an exemplary embodiment of an integrated PMA and ATS assembly in accordance with the disclosure is shown in FIG. 1 and is designated generally by reference character 100. Other embodiments of integrated assembly PMA and ATS assembly 100 in accordance with the disclosure, or aspects thereof, are provided in FIGS. 2-6, as will be described. The system of the present disclosure can be used for aircraft engines, and more specifically for aircraft engine accessories. As will be appreciated other uses of the disclosed devices and methods are also possible.

Integrated PMA and ATS assembly 100 includes an ATS 10 and a PMA stator assembly 30. ATS 10 is axially disposed within an ATS housing 12. ATS housing 12 includes an external PMA electrical connector 29 for electrically connecting PMA stator assembly 30 to an engine harness assembly (not shown). ATS housing 12 defines a radial flange 20 that extends circumferentially about ATS housing 12 and which is substantially orthogonal with respect to an axis 42 of integrated PMA and ATS assembly 100. ATS housing 12 also defines a PMA mounting face 14 (shown in FIG. 3) configured and adapted to axially seat PMA stator assembly 30 to ATS housing 12.

With continuing reference to FIG. 1, PMA stator assembly 30 includes a PMA stator winding assembly 32 and PMA mounting structure 36. PMA stator winding assembly 32 includes a plurality of stator windings as suitable for a given power generation requirement. PMA mounting structure 36 includes an alignment aperture 38 extending through PMA mounting structure 36 and extending parallel with respect to axis 42. Alignment aperture 38 is configured an adapted to receive an alignment member 16 fixed to ATS housing 12, thereby fixing PMA stator assembly 30 in a single radial orientation 18 (shown in FIG. 3) with respect to ATS housing 12. PMA stator winding assembly 30 removably attaches to ATS housing 12 with a plurality of fasteners that fixedly couple PMA stator assembly 30 to ATS 10 by fixing PMA mounting structure 36 to ATS mounting face 14 of ATS housing 12. As will be appreciated, ATS mounting face 14 includes corresponding fastener apertures suitably sized and arranged to receive the fasteners. Referring now to FIG. 2, ATS 10 and PMA stator assembly 30 are shown detached from one another with PMA stator assembly 30 displaced along axis 42. PMA stator assembly 30 defines a face 44 and includes a first PMA quick connector 34 and a second PMA quick connector 40. First PMA quick connector 34 is mechanically attached to PMA mounting structure 36 and electrically connected the PMA stator winding assembly 32. Second PMA quick connector 40 also mechanically attached to PMA mounting structure 36 and is electrically connected the PMA stator winding assembly. First and second PMA quick connectors 34 and 40 are radially offset with respect to axis 42 and axially offset from face 44 of PMA mounting structure 36. First and second PMA quick connectors 34 and 40 are configured an arranged such that, when PMA stator assembly 30 is oriented in a single radial orientation for installation, first and second PMA quick connectors 34 and 40 are axially aligned for seating and electrically connecting with corresponding ATS quick connectors disposed on ATS housing 12.

In the illustrated embodiment, first and second PMA quick connectors 34 and 40 are male connectors having ten contact pins configured and adapted to connect with corresponding female connectors (shown in FIG. 3). As will be appreciated, first and second PMA quick connectors 34 and 40 can also be female connectors that connect to corresponding male connectors disposed on ATS 10 within the scope of the present disclosure. As will also be appreciated, any suitable number of contact pins or electrical connectors can be used electrically couple PMA stator winding assembly 32 through first and second PMA quick connectors 34 and 40 and remain within the scope of the present disclosure.

PMA mounting structure 36 defines an axially extending rim structure and a radially extending flange with a plurality of lobes. Upon assembly of PMA stator assembly 30 with ATS 10, the rim structure radially seats against an inner surface of ATS housing 12. PMA stator assembly 30 is positioned for coupling with ATS 12 housing by radially cocking PMA stator assembly 30 about axis 42, thereby radially aligning the PMA quick connectors 34 and 40 and ATS quick connectors 22 and 24, and a successive axially seating operation, whereby the PMA quick connectors 34 and 40 seat against corresponding ATS quick connectors 22 and 24. No tools are required to make the electrical connection between PMA stator assembly 30 and ATS housing 12, and electrical connection is incidental to mechanically coupling the components.

A lobe of the rim structure defines alignment aperture 38 and other lobes (four shown in FIG. 2) define respective fastener apertures. In embodiments, alignment member 16 has a greater diameter than each of the respective fastener apertures, thereby allowing PMA stator assembly 30 to seat in a single radial orientation where the fastener apertures respectively with corresponding fastener apertures in ATS housing 12. In certain embodiments, the flange circumferentially extends radially outward from axis 42 to a distance that is greater than an offset distance of alignment member 16 such that the flange interferes with alignment member 16 in all radial orientations other than the single radial orientation wherein alignment member 16 can be received within alignment aperture 38 (shown in FIG. 1). As will be appreciated, any suitable alignment member and corresponding alignment aperture can be employed and remain within the scope of the present disclosure, such as shafts with corresponding apertures, keys with corresponding keyways, or splines with corresponding slots for example.

Referring now to FIG. 3, air turbine housing 12 is shown. ATS housing 12 defines a PMA mounting face 14 with an aperture for receiving AGB shaft 8 (shown in FIG. 5), and includes an alignment member 16, a first ATS quick connector 22, and a second ATS quick connector 24. Alignment member 16 is fixed to ATS housing 12 such that it radially fixes PMA stator assembly 30 when PMA stator assembly 30 is axially seated against ATS housing 12. First ATS quick connector 22 is disposed on mounting face 14 and electrically connects to corresponding first PMA quick connector 34 when ATS stator assembly 30 is seated against ATS housing 12. Second ATS quick connector 24 is disposed on mounting face 14 and electrically connects to corresponding second PMA quick connector 40 when ATS stator assembly 30 is seated against ATS housing 12. First and second ATS quick connectors 22 and 24 are disposed so as to be radially offset from axis 42 by a distance D that corresponds to a radial offset distance of first and second PMA quick connectors 34 and 40. As will be appreciated, first and second ATS quick connectors 22 and 24 can have different radial offset distances and remain within the scope of the present disclosure.

With reference to FIG. 4, integrated PMA and ATS assembly 100 is shown attached an AGB 2 at an AGB mounting pad 4 defined by an AGB housing 6. AGB mounting pad 4 defines an AGB radial flange 9 circumferentially surrounding an AGB shaft 8 (shown in FIG. 5) and opposing ATS housing radial flange 20. A clamp 46 circumferentially surrounds AGB radial flange 9 and ATS housing radial flange 20, thereby rigidly fixing integrated PMA and ATS assembly 100 to AGB 2. In the illustrated embodiment, clamp 46 is a quick release clamp configured and arranged for removal by loosening a single fastener, and in certain embodiments provides for toolless removal of integrated PMA and ATS assembly 100, thereby allowing for rapid removal of integrated PMA and ATS assembly 100 for inspection, servicing or replacement. As will be appreciated, other types of clamps and flanged arrangements such as splines or keyways are possible and within the scope of the present disclosure.

Figure 5:
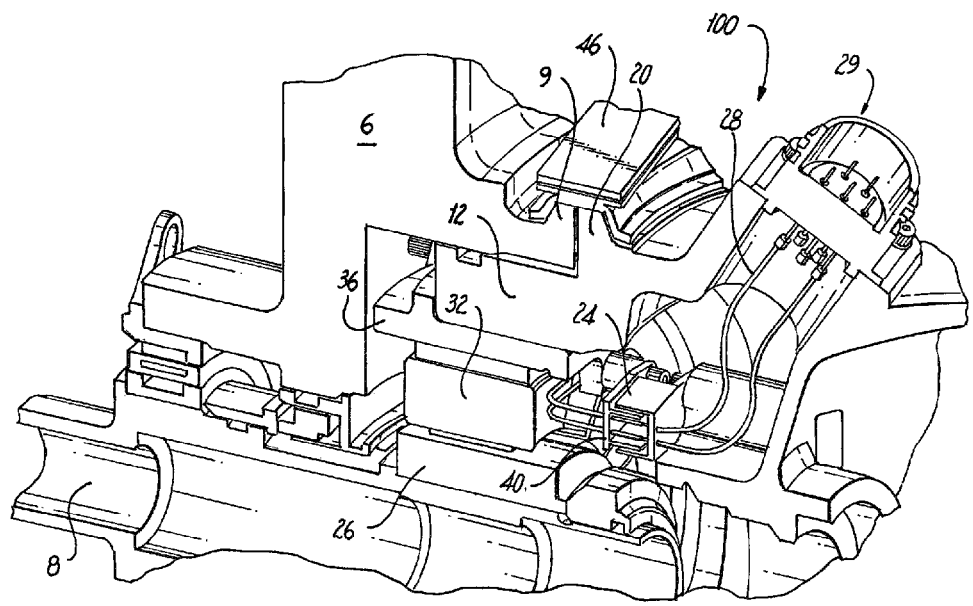
FIG. 5 is a cross-sectional side perspective view of the integrated PMA and ATS assembly of FIG. 1, showing the assembly attached to an AGB shaft and radially enveloped by the ATS housing and AGB housing.

With reference to FIG. 5, integrated PMA and ATS assembly 100 is shown coupled to shaft 8 of AGB 2. Shaft 8 includes a PMA rotor 26 disposed on shaft 8 that is circumferentially surrounded by PMA stator winding assembly 32. As will be appreciated, accessory gearbox 2 includes a shaft 8 having an end portion operatively disposed in ATS housing 12 configured and adapted for rotational engagement by ATS 10 during engine startup operation. In the illustrated embodiment PMA mounting structure 36 is circumferentially surrounded by respective portion of ATS housing 12 and AGB housing 6, thereby providing for attachment of integrated ATS and PMA assembly 100 with AGB 2 such that its overhung moment is within an acceptable level and does not unacceptably increase the weight of the assembly.

A permanent magnet of PMA rotor 26 is electromagnetically coupled with the stator windings of PMA stator winding assembly 32. PMA stator winding assembly 32 in turn is electrically connected to first and second PMA quick connectors 34 and 40. First and second PMA quick connectors 34 and 40 are seated in corresponding first and second ATS quick connectors 22 and 34, PMA quick connector 40 being shown seated in ATS quick connector 24 in FIG. 5. An electrical lead 28 disposed within ATS housing 28 electrically connects ATS quick connector 24 to external PMA connector 29. As will be appreciated, any suitable number of electrical leads can be provided within ATS housing 12 to electrically couple first and second PMA quick connectors 34 and 40 to PMA external connector 29, or additional PMA external connectors, as suitable for a given application within the scope of the present disclosure.

In embodiments, PMA stator assembly 30 is piloted and bolted into the drive end of the ATS housing and the electrical connection between the PMA quick connectors and ATS quick connectors is made automatically when the stator is installed into ATS housing 12. This allows for integration of the PMA into another accessory without compromising removal and replacement times.

FIG. 6 shows another embodiment of an integrated PMA and ATS assembly 200. Integrated PMA and ATS assembly 200 is similar to integrated PMA and ATS assembly 100 and additional includes a PMA stator assembly 30 stacked between the ATS housing 12 and AGB mounting pad 4. In the stacked configuration, PMA stator assembly 30 is axially seated against AGB flange 20 on one end and bolted to ATS 10 on its other end by a plurality of fasteners.

Stacking PMA assembly 30 between AGB 2 and ATS 10 allow for modification an existing AGB configuration by integrating the PMA and ATS to couple to a single AGB mounting pad as an alternative to a prior configuration where the PMA and ATS occupy separate AGB mounting pads, thereby freeing an AGB mounting pad for an additional accessory. As will appreciated, fasteners and opposing flanges are suitably arranged so as to manage the overhung moment associated with the stacked configuration, and PMA external connectors 29 are located on the PMA stator assembly 30 for purposes limiting modifications to ATS 10.

Embodiments of the integrated PMA and ATS described above allow for incorporation of the PMA stator windings into another accessory, such as an ATS, without significant increase in removal and replacement time for either accessory. Embodiments of the integrated PMA and ATS described above also allow for improvements in AGB envelope, weight and cost. Embodiments of the integrated PMA and ATS described above further allow for a more optimal, weight efficient mounting structure with limited split-line loading. Finally, embodiments of the integrated PMA and ATS described above provide for easy access to an AGB shaft seal 202 (shown in FIG. 6) for removal and replacement.

The methods and systems of the present invention, as described above and shown in the drawings, provide an integrated PMA and ATS assembly. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A permanent magnet alternator (PMA) stator assembly comprising:
   a PMA stator winding assembly;
   a first PMA quick connector electrically connected to the PMA stator winding assembly; and
   a PMA mounting structure coupled to the first PMA quick connector to the PMA stator winding assembly and defining an alignment aperture for removably attaching the PMA stator assembly to an air turbine starter (ATS) housing.

2. A PMA stator assembly as recited in claim 1, wherein the first PMA quick connector is radially offset from an axis of the PMA stator.

3. A PMA stator assembly as recited in claim 2, further comprising a second PMA quick connector electrically connected to the PMA stator and radially offset from the axis of the PMA stator.

4. A PMA stator as recited in claim 3, wherein the first PMA quick connector and second PMA quick connector are disposed on a common face of the PMA stator assembly.

5. An integrated PMA and ATS assembly comprising:
   a PMA stator assembly as recited in claim 1;
   an ATS with an ATS housing defining a PMA mounting face; and
   an alignment member fixed to ATS housing and disposed within the alignment aperture radially fixing the PMA stator assembly relative to an ATS housing axis.

6. An integrated assembly as recited in claim 5, wherein the ATS housing defines a radial flange for removably attaching the integrated PMA stator and ATS assembly to a mounting pad of an accessory gearbox.

7. An integrated assembly as recited in claim 5, further comprising a first ATS quick connector disposed on the ATS housing mounting face and electrically connected to the first PMA quick connector.

8. An integrated assembly as recited in claim 5, further comprising a second ATS quick connector disposed on the PMA housing mounting face and radially offset by an equivalent distance from the ATS housing axis as the first PMA quick connector.

9. An assembly as recited in claim 7, further comprising an external PMA electrical connector for electrically connecting the PMA stator assembly to an engine harness assembly.

10. An assembly as recited in claim 7, further comprising a lead disposed inside the ATS housing and electrically connecting the external PMA electrical connector to the PMA stator assembly.

11. An assembly as recited in claim 8, wherein the lead electrically connects the external PMA stator to the first ATS quick connector.

12. An accessory gearbox (AGB) assembly comprising:
an AGB housing defining an AGB accessory mounting pad;
an integrated PMA and ATS assembly as recited in claim 5; and
an AGB shaft extending from the AGB gearbox into the ATS housing and having a PMA rotor disposed on the AGB shaft, wherein the PMA stator assembly circumferentially surrounds the PMA rotor.

13. An AGB assembly as recited in claim 12, wherein the AGB accessory mounting pad defines an AGB radial flange opposing the ATS housing radial flange.

14. An AGB assembly as recited in claim 13, further comprising a clamp enveloping the AGB radial flange and opposing ATS housing radial flange.

15. An AGB assembly as recited in claim 12, wherein the PMA stator assembly is stacked between the ATS housing and the AGB accessory mounting pad.

16. An AGB assembly as recited in claim 12, wherein the PMA stator assembly is circumferentially surrounded by the ATS housing.

17. An AGB assembly as recited in claim 12, wherein portions of the PMA stator assembly is circumferentially surrounded by the ATS housing and the AGB housing.

* * * * *